Jan. 30, 1951 L. E. ANDERSON 2,539,767
METHOD OF MAKING A FILTER ELEMENT
Filed May 5, 1947
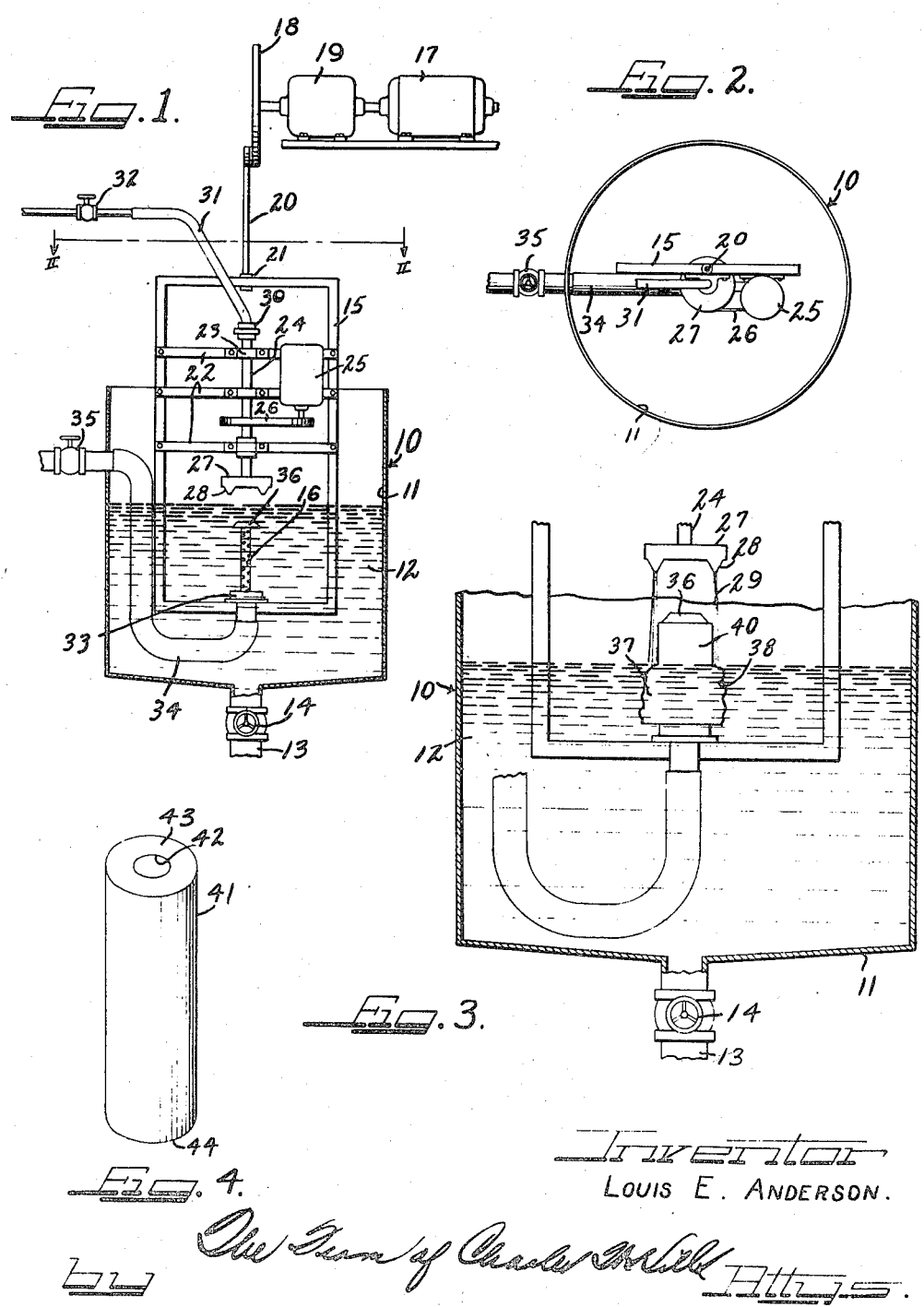
Inventor
LOUIS E. ANDERSON.

Patented Jan. 30, 1951

2,539,767

UNITED STATES PATENT OFFICE 2,539,767

METHOD OF MAKING A FILTER ELEMENT

Louis E. Anderson, Chicago, Ill., assignor, by mesne assignments, to The Cuno Engineering Corporation, Meriden, Conn., a corporation of Connecticut Application May 5, 1947, Serial No. 745,908

6 Claims. (Cl. 92—57)

This invention relates to a method of and an apparatus for making a filter element. More particularly, the invention relates to the manufacture of a filter element of the depth filtration type in the form of a relatively rigid, self-supporting, thick-walled tubular element composed entirely of resin-impregnated fibrous material.

As disclosed in my copending application, entitled "Filter Element and Method of Making the Same," Serial No. 745,909, filed May 5, 1947, the filter element to be made by my present method and using apparatus of my present invention comprises an element that is intended for use in filtering liquids and gases that are caused to flow radially inwardly through the filter element under a differential pressure. In order to obtain the maximum filtering efficiency, the fibrous structure of the filter element is of graded porosity, with the size of the pores progressively increasing radially outwardly toward the outer surface. By virtue of such graduated porosity, or density, as the fluid flows inwardly through progressively smaller and mort numerous interstices, the foreign particles to be filtered out penetrate to varying depths according to their size. This means that the filter element can accommodate more solids wihout affecting flow, with a consequently longer life before the element needs replacing. Such graduated porosity in the filter element is accomplished by accreting resin-impregnated fibers from a liquid dispersion of such fibers under controlled conditions as to the amount of vacuum used in effecting such accretion and as to the composition characteristics of the fibrous stock used.

In making my preferred type of filter element, wool fibers are the principal fibrous material employed, with up to 40% by weight of other fibers, such as esparto, Yucca, asbestos and the like. The fibrous material is first beaten and then added to a liquid dispersion of a resin in a solvent, or any suitable liquid suspending medium. The resulting mixture is brought to proper consistency and then fed into a felting tank where it is kept thoroughly agitated in order to maintain a uniform consistency throughout the entire mass.

In accordance with the accretion step that I employ, one or more perforate formers, or dies, are immersed within the liquid suspension of the fibers within the felting tank and the resin-impregnated fibers are caused to be accreted upon said formers by the application of a controlled degree of suction imposed upon the interior of said formers. By the control of the degree of vacuum and the length of time over which the vacuum is applied, in conjunction with the proper control of the characteristics of the fibers, a filter carcass is produced of the depth, or thickness, and graded porosity that is desired. The proportion of resin in the fibrous carcass is also a factor in producing a filter element of the desired degree of strength to withstand the pressure drop to which it may be subjected in use. A specific composition that has been found particularly suitable is one comprising 85% wool fibers, 15% esparto fibers and 35% resin content, by weight of the finished filter element.

In the formation of the wet carcass by accretion, it is possible to approximate a roughly cylindrical form of carcass, but the outer fibers are too loosely held and the outer contour of the carcass is too rough and irregular to give a satisfactory filter element merely upon drying the wet carcass and setting its resin content. In accordance with my present invention, I have found it preferable to trim the wet carcass to remove the loosely held outer fibrous portion and give to the carcass the desired cylindrical form and dimension.

This trimming operation is accomplished by means of a rotatng jet trimming device, in accordance with which jets of liquid, such as water, are directed at relatively high pressures against the carcass as it emerges from the liquid suspension of fibrous material. In its preferred form, the trimming device comprises a rotatably mounted manifold in the form of a hollow disk having downwardly directed nozzles, or orifices. Means are provided for rotating the disk about its axis, which axis is coincident with the axis of the former on which the wet carcass is being built up. As the carcass is raised relative to the body of the liquid fibrous suspension and emerges therefrom, the trimming device is set into operation to slough off the loosely held outer portions of the carcass and trim the carcass to cylindrical form. Suction is continuously applied to the former and to the carcass carried thereby during the trimming operation, so that the mass of the carcass within the cylindrical path of the jets is sucked tightly against the former and accordingly retains the cylindrical form imparted thereto by the jets. In addition to the trimming action of the jets, the jets thus aid in washing the excess of resin dispersion, or solution, from the adherent mass of fibers on the former, since much of the liquid of the jets is sucked inwardly through said mass by the action of suction on the former.

It is therefore an important object of this invention to provide a method of making a thick-walled tubular filter element by an accretion step, in accordance with which a roughly cylindrical carcass of wet fibrous material is built up and then trimmed to substantially cylindrical form by a rotating jet of liquid directed thereagainst.

It is a further important object of this invention to provide a method of trimming a wet carcass of accreted fibrous material by directing against said carcass, while the same is subjected to suction, a series of jets arranged circularly for rotation about a continuation of the axis of the carcass, whereby the loosely held outer fibrous portions of the carcass are caused to be sloughed off to leave a substantially cylindrical carcass.

It is a still further important object of this invention to provide apparatus for the making of a thick-walled, tubular filter element of resin-impregnated fibrous material, which apparatus includes means for forming a roughly cylindrical wet carcass of accreted resin-impregnated fibers, and liquid jet means for trimming said carcass to substantially cylindrical form.

Other and further important objects of this invention will be apparent from the disclosures in the specification and the accompanying drawings.

On the drawings:

Figure 1 is a vertical sectional view, more or less schematic, of apparatus for the making of filter elements and embodying the principles of my invention.

Figure 2 is a top plan view, taken substantially along the line II—II of Figure 1.

Figure 3 is an enlarged vertical sectional view illustrating the trimming operation.

Figure 4 is a perspective view of the finished filter element.

The reference numeral 10 indicates generally equipment embodying my invention, comprising a felting tank 11 for containing a body of fibrous material suspended in a liquid medium, said body being indicated by the reference numeral 12. Said tank is provided with a drain pipe 13, adapted to be controlled by means of a valve 14.

A carriage 15 for supporting one or more formers, or dies, 16, is adapted to be suspended in the tank 11, with means provided for raising and lowering said carriage relative to the tank. As shown, such means comprises a motor 17 for driving an eccentric wheel 18 through a speed reducer 19, and an eccentric arm 20 connected to said wheel 18 and pivotally connected, as at 21 to the upper portion of the frame 15. Said frame 15 is provided with cross bars 22 on which are mounted bearings 23 for a vertically extending shaft 24. Said shaft 24 is driven by a motor 25 through a suitable belt and pulley arrangement 26. The lower end of the shaft 24 carries a hollow disk 27 having a downwardly extending annular arrangement of nozzles or apertures 28 for discharging downwardly directed jets of water, indicated by the reference numeral 29 (Fig. 3). The shaft 24 is hollow and is connected through a coupling 30 to a pipe 31 controlled by a valve 32 and leading to a suitable source of water under pressure.

The former 16 comprises a foraminous tube that is substantially cylindrical, but preferably slightly tapered lengthwise, that serves as a core for the building up of a wet carcass of fibrous material. Said former 16 is releasably secured in a hollow block 33 connected by means of a flexible hose 34, which is controlled by a valve 35 and which leads to a suitable source of vacuum (not shown). The former 16 is provided at its upper end with a disk 36, adapted to be removably retained upon the upper end of the former to close the open upper end thereof.

In operation, the tank 11 is partly filled with the body 12 of the liquid suspension of fibrous material. The consistency of the suspension in the felting tank is maintained at about one-half of 1% of fibrous material by weight, on an air-dry basis. The fibrous material is mixed with a resin solution, or dispersion, in a suitable solvent, or liquid dispersing medium, such as water, and brought to this consistency before being charged into the felting tank. Various resins, including the phenol, urea and melamine types of thermosetting resins, as well as various types of thermoplastic resins, may be employed. The amount of resin based upon the fiber content, may range from 15 to 60%, the amount being varied in accordance with the strength of the fibrous filter element that is desired. In general, the larger the percentage of resin, the stronger and more rigid is the ultimate filter element. As an example of a formulation for producing a filter element having a compressive strength of the order of 50 pounds per square inch, or higher, this can be suitably accomplished by using a mixture of 85% wool and 15% esparto fibers with 35% of resin, by weight of the fibers. Such a formulation, when processed as herein described, is highly effective or filtering out foreign particles of the order of size of 25 microns diameter and over.

With the former 16 immersed within the fibrous suspension 12, as shown in Figure 1, suction is applied to the former through the valve controlled flexible pipe 34. The application of suction to the former 16 causes an accretion of fibers thereon from the suspension of fibers in the tank. Such accretion builds up a carcass 37 (Fig. 3), which is of roughly cylindrical shape but the outer portions of which comprise loosely held fibers built up into a somewhat irregular contour, as indicated at 38.

When the carcass 37 has reached the desired size, the motor 17 is operated to raise the carriage 15 out of the fibrous suspension 12 and, at the same time, the valve 32 is opened to cause jets of liquid, 29, to be discharged from the orifices 28 of the hollow disk 27. The motor 25 is simultaneously energized to rotate the shaft 24 and its attached disk 27, thereby producing a cylindrical series of jets 29, the path of revolution of which is coaxial with the axis of the former 16. As the carriage 15 continues to rise, the former and its carcass 37 emerge from the surface of the fibrous suspension and the cylindrical jet 29 acts to slough off the outer loosely held and roughly contoured fibrous portion 38 to produce a substantially cylindrical carcass 40. This operation is continued until the entire carcass 37 has been trimmed by the jet trimmer to a substantially cylindrical form. During this entire operation, suction is maintained upon the former to limit the extent of the trimming action to the portion of the wet carcass lying within the path of rotating jets 29. At the completion of the trimming operation, the valve 32 is shut off, followed by the closing of the valve 35. The substantially cylindrical carcass 40 is then removed from the base block 33 and subjected to suitable drying and resin curing and setting operations.

such as described in my copending application entitled "Filter Element and Method of Making the Same," filed May 5, 1947, U. S. Serial No. 745,909.

In its final form, as illustrated in Figure 4, my filter element comprises a thick walled, cylindrical element 41 having an axially extending bore 42 extending between the plane endwalls 43 and 44. The body of the filter element consists of fibrous material impregnated and bonded together with a resinous binding medium, with the resin in such proportions as to give sufficient rigidity to the elements to obviate the necessity of using a reenforcing carbon, yet in insufficient proportions to interfere with the filtering properties of the filter in a depth-type filter.

I claim as my invention:

1. In the method of forming cylindrical thick-walled carcasses of accreted fibers including the accretion of fibers into a generally cylindrical carcass on a foraminous former from a liquid suspension of fibers by the application of vacuum to the former, the step of directing jets of liquid against the outer surface of the formed carcass parallel to its axis as it emerges from the liquid suspension while suction is applied thereto to remove the loosely held outer fibrous portion and to trim said carcass to the desired outer cylindrical contour.

2. In the method of forming cylindrical thick-walled carcasses of accreted fibers including the accretion of fibers on a foraminous former from a liquid suspension of fibers by the application of vacuum to the former, the step of directing circularly rotating jets of liquid against the formed carcass parallel to its axis as it emerges from the liquid suspension while suction is applied thereto to remove the loosely held outer fibrous portion and to trim said carcass to a cylindrical outer contour.

3. The method of making a filter element, which comprises applying suction to a foraminous former immersed in a fiber suspension to build up on said former a thick-walled cylindrical carcass of accreted fibers, effecting the emergence of said carcass from said fiber suspension while said carcass is still subjected to suction, and directing rotating jets of liquid in a cylindrical pattern against said carcass as it emerges from the liquid suspension to remove the loosely held outer fibrous portion and to trim the same in accordance with said pattern.

4. The method of making a filter element, which comprises applying suction to a foraminous former immersed in a fiber suspension to build up on said former a generally cylindrical, thick-walled carcass of accreted fibers, effecting the emergence of said carcass from said fiber suspension with its axis generally vertical while said carcass is still subjected to suction, and directing circularly rotating jets of liquid in a downward direction against said carcass as it emerges from the liquid suspension to remove the loosely held outer fibrous portion and to trim the same to a cylindrical shape.

5. The method of making a cylindrical thick-walled filter element, which comprises immersing a foraminous cylindrical former with its axis substantially vertical in an aqueous fiber suspension, applying suction to said former to cause fibers from said suspension to be accreted on said former and build up a wet carcass thereon, raising said carcass while continuing to apply suction thereto, and directing a circularly rotating series of jets of water downwardly against the rising carcass as the same emerges from said suspension to slough off the loosely held outer portions of said carcass to thereby give a cylindrical contour to said carcass.

6. The method of making a cylindrical thick-walled filter element, which comprises immersing a foraminous cylindrical former in an aqueous fiber suspension, applying suction to said former to cause fibers from said suspension to be accreted on said former and build up a wet carcass thereon, raising said carcass while continuing to apply suction thereto and directing a circularly rotating series of jets of water arranged coaxially of said former to cause said jets to impinge against the rising carcass as the same emerges from said suspension to slough off the loosely held portions of said carcass to thereby give a cylindrical contour to said carcass, suction being applied to said carcass and said carcass being gradually raised from said suspension until the trimming action of said jets is complete.

LOUIS E. ANDERSON.

REFERENCES CITED

The following references are of record in the file of this patent:

UNITED STATES PATENTS

| Number | Name | Date |
| --- | --- | --- |
| 1,623,278 | Sears | Apr. 5, 1927 |
| 1,997,136 | Devereux | Apr. 9, 1935 |
| 2,023,200 | Huff et al. | Dec. 3, 1935 |
| 2,215,335 | Parkhill et al. | Sept. 17, 1940 |
| 2,383,066 | McDermott | Aug. 21, 1945 |

FOREIGN PATENTS

| Number | Country | Date |
| --- | --- | --- |
| 41,964 | Denmark | Mar. 31, 1930 |